United States Patent
Onmori et al.

(10) Patent No.: US 6,622,952 B2
(45) Date of Patent: Sep. 23, 2003

(54) MAGNETIC TAPE CASSETTE

(75) Inventors: Shozo Onmori, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/193,993

(22) Filed: Jul. 15, 2002

(65) Prior Publication Data
US 2002/0179762 A1 Dec. 5, 2002

Related U.S. Application Data

(62) Division of application No. 09/734,689, filed on Dec. 13, 2000.

(30) Foreign Application Priority Data

| Dec. 13, 1999 | (JP) | 11-352982 |
| Dec. 24, 1999 | (JP) | 11-366603 |
| Jan. 14, 2000 | (JP) | 2000-006394 |

(51) Int. Cl.$^7$ ............................. G11B 23/04
(52) U.S. Cl. .................. 242/345.3; 360/132
(58) Field of Search ............. 242/345.3; 360/132

(56) References Cited

U.S. PATENT DOCUMENTS

| 3,556,433 A | * | 1/1971 | Georges | 242/345.2 |
| 3,791,608 A | | 2/1974 | Akash et al. | |
| 3,857,532 A | * | 12/1974 | Bastiaans | 242/345.3 |
| 4,154,886 A | | 5/1979 | Yamazaki et al. | |
| 4,411,943 A | * | 10/1983 | Akao | 428/161 |
| 4,709,290 A | * | 11/1987 | Schoettle et al. | 242/345 |
| 4,743,992 A | * | 5/1988 | Komiyama et al. | 242/345.3 |
| 4,746,575 A | * | 5/1988 | Scarati et al. | 428/421 |
| 4,838,496 A | * | 6/1989 | Kubota et al. | 242/548.4 |
| 4,990,077 A | | 2/1991 | Morita | |
| 5,377,066 A | * | 12/1994 | Katagiri | 360/132 |
| 5,963,403 A | | 10/1999 | Shimomura et al. | |

FOREIGN PATENT DOCUMENTS

| EP | 0 700 764 A1 | 3/1996 |
| EP | 0 772 197 A2 | 5/1997 |

* cited by examiner

*Primary Examiner*—Donald P. Walsh
*Assistant Examiner*—Joseph C. Rodriguez
(74) *Attorney, Agent, or Firm*—Sughrue Mion, PLLC

(57) ABSTRACT

The cassette half molding method molds one of upper and lower halves of the magnetic tape cassette by injection molding with an injection mold in which a gas vent pin for smoothing a flow of molten resin to be introduced in the cavity for molding a transparent or semitransparent window portion provided in the upper half. The cassette half is molded by this molding method. The magnetic tape cassette has a friction sheet interposed either between a pair of take-up hubs and the upper half, or between the pair of take-up hubs and the lower half, or both, and the friction sheet is made of polyethylene-based resin and has a surface electric resistance value in the range of $1\times10^7$ Ω to $1\times10^{10}$ Ω. The magnetic tape cassette has a rib for reducing a resistance when the roller of the detecting member passes through which is provided at a position corresponding to a recess and on a side of the front lid in the top surface of the body case.

5 Claims, 8 Drawing Sheets

ANTISTATIC EFFECT AND ANTISTATIC AGENT PEEL RATE/TAPE STICKING RATE

MAGNETIC TAPE CASSETTE

This is a divisional of application Ser. No. 09/734,689 filed Dec. 13, 2000; the disclosure of which is incorporated herein by reference.

BACKGROUND OF THE INVENTION

1. Field of the Invention

The present invention relates to a technical field of a magnetic tape cassette and an injection molding method in case of molding a resin product for the magnetic tape cassette with molding dies, and more particularly, relates to a cassette half for forming a case of the magnetic tape cassette for accommodating a magnetic tape wound around a pair of take-up hubs and a molding method for molding the cassette half, a magnetic tape cassette provided with an improved friction sheet for preventing static charge of the magnetic tape and keeping slidability of the magnetic tape, and a magnetic tape cassette improved in detachability to a cassette automatic delivery apparatus.

2. Description of the Related Art

For example, a magnetic tape cassette used to an audio system or a computer may be exemplified as one example of the resin product. In general, the magnetic tape cassette has a structure in which a pair of hubs around which the magnetic tape is wound are rotatably incorporated and retained in a case body formed of upper and lower cassette halves coupled together in a lid-alignment manner. Such cassette halves are injection molded of thermoplastic resin such as PS (polystyrene), or ABS (acrylonitrile butadiene styrene resin) general. In order to observe and confirm the winding condition of the magnetic tape from the outside, the cassette halves as a whole are made of transparent material such as AS (acrylonitrile styrene) or PS, or a window portion that is transparent or semitransparent is formed in the opaque cassette half bodies.

Conventionally, this window portion is formed by adhesion with adhesive or supersonic welding of the window material molded separately from the cassette half bodies. However, in this case, since the molding step and adhesion step for the window portion are required, there is a restriction on a design and productivity is not so good. Accordingly, recently, the cassette half bodies and window portions are integrally molded through a color injection molding (or multi-color injection molding) method.

FIG. 8 is a plan view of an upper half of a conventional magnetic tape cassette.

A window portion 112 that is transparent or semitransparent is provided in the upper half 110 for observing and confirming the winding condition of the magnetic tape accommodated in the cassette halves from the outside. A pair of ribs 114 and 116 are provided for positioning and regulating the take-up hubs around which the magnetic tape is wound in this window portion 112. These ribs 114 and 116 are divided into two portions, for example, 114a and 114b, and arranged in the circumferential direction in conformity with the shape of the take-up hubs.

A cross-sectional view taken along the line IX—IX of FIG. 8 is shown in FIG. 9.

As shown in FIG. 9, position regulating ribs 114 (114a, 114b) of the take-up hubs are formed in the window portion 112 of the upper half 110 with a height in such an appropriate range that they can regulate the position of the take-up hubs and do not prevent the rotation of the take-up hubs.

A state that the window portion 112 is molded by means of, for example, the two-color injection molding method is shown in FIG. 10.

Molten resin is injected into a space (cavity) surrounded by a front mold (cavity side part) 120a and a movable half (force side part) 120b of the molding dies and a slide core 122 to form the upper half body 110. Thereafter, as shown in FIG. 10, the slide core 122 is slid by a thickness of the window portion 112. Transparent or semitransparent resin is injected from a gate 126 into the space (cavity) 124 formed therein to form the window portion 112.

At this time, recesses 128 (128a, 128b) for take-up hub position regulating ribs 114 (114a, 114b) to be formed in the window portion 112 are formed in the slide core 122.

However, in the case where the window portion 112 of the upper half of the magnetic tape cassette is formed by the injection molding as shown in FIGS. 8 and 9 like the above-described conventional case, there are the following defects. Namely, as shown in FIG. 10, the molten resin injected into the cavity 124 from the gate 126 flows as indicated by the arrows. In the flat portion, the resin flows horizontally without any deflection but in the recesses 128a, 128b corresponding to the portions of the take-up hub position regulating ribs 114 (see FIG. 8), the resin enters the inside thereof once, and thereafter, again returns to move further forward. Also, at this time, the recesses 128 (128a, 128b) are directed in a direction perpendicular to the advance direction of the resin and the flow is further obstructed. Furthermore, if a gas that is generated due to heat is contained in the resin, the flow of the resin is further obstructed.

Thus, since the molten resin is filled to ride the portion of the take-up hub position regulating ribs 114 (see FIG. 8), the fludized layer of the resin is advanced while being subject to the resistance. As a result, the resin is spread and advanced more in the portion where no take-up hub position regulating ribs 114 are provided. As shown in a plan view of FIG. 11, the flows of the resin coming in the two directions are brought into contact with each other at the end portion of the window portion 112 (the final filling portion of the resin). As a result, an abnormal color portion having streaks that are called welds 130 is formed at the joint portion to cause a problem in that the outer appearance becomes worse. In particular, since the window portion 112 is transparent, there is a problem in that such a quality reduction is undesirable.

By the way, as well known, in the magnetic tape cassette, under the condition that the respective end portions of the longitudinal magnetic tape are fixed to the pair of take-up hubs, respectively, the pair of take-up hubs around which the magnetic tape is wound are accommodated in a cassette bodies (upper half and lower half). Only a part of the magnetic tape tensioned between the pair of take-up hubs is exposed to the outside of the cassette body such that the magnetic tape may be brought into contact with a magnetic head at least when the cassette is loaded on a recording/reproducing apparatus of the magnetic tape.

When the magnetic tape cassette is loaded on the recording/reproducing apparatus, the part of the magnetic tape tensioned between the take-up hubs and exposed from the cassette body is brought into contact with the magnetic head within the recording/reproducing apparatus, the take-up hubs are rotated, the magnetic tape travels and slidingly contacts with the magnetic head within the recording/reproducing apparatus, and the magnetic head records information onto the magnetic tape and reproduces the information from the magnetic tape.

In an audio magnetic tape cassette, when the magnetic tape cassette is loaded on the recording/reproducing apparatus, the part of the magnetic tape tensioned between the take-up hubs and exposed from the cassette body is brought into contact with the magnetic head within the recording/reproducing apparatus, the take-up hubs are rotated, the magnetic tape travels and slidingly contacts with the magnetic head within the recording/reproducing apparatus, and the magnetic head records information onto the magnetic tape and reproduces the information from the magnetic tape. In a cassette having a front cover for protecting the tape such as a video magnetic tape cassette, when the magnetic tape cassette is loaded on the recording/reproducing apparatus, the front cover is rotated and moved to a position where the magnetic tape is opened by a mechanism within the recording/reproducing apparatus in cooperation with the loading operation. The part of the magnetic tape tensioned between the take-up hubs is thus exposed from the cassette body. Then, the take-up hubs are rotated, and the magnetic tape travels and slides in contact with the magnetic head within the recording/reproducing apparatus, so that the magnetic head records the information onto the magnetic tape and reproduces the information from the magnetic tape.

When the magnetic tape moves up and down or meanders upon the travel thereof, the magnetic tape is not exactly contacted with the magnetic head or slid well. Thus, the appropriate recording/reproducing is impossible. Also, there is a fear of a cause of other breakdown. Accordingly, it is necessary to suppress the up-and-down movement or meanders upon the travel of the magnetic tape, to enhance the regulating precision of the travel position of the magnetic tape and to stable the traveling property.

For this reason, conventionally, in the magnetic tape cassette using flangeless type take-up hubs, a pair of friction sheets are interposed between the take-up hubs around which the magnetic tape is wound and the cassette bodies (upper and lower halves) to thereby regulate the travel position (height) of the magnetic tape to adjust the travel position of the magnetic tape. Furthermore, a linear stamped portion (drawn portion) is provided on the friction sheet to regulate the travel position (height) of the magnetic tape by the height of the drawn portion.

On the other hand, when the thickness of the magnetic tape is equal to or less than 10 μm, depending upon the magnetic surface and the kind of the base material, the tape edge of the magnetic tape becomes sharp so that the durability of the material that contacts with the tape edge, such as the friction sheet causes a problem. Further, the surface electric resistance value of the magnetic surface of the magnetic tape and the base material is in the range of $1 \times 10^5$ Ω to $1 \times 10^{12}$ Ω. There is a problem of the fear of breakdown such as sticking of the magnetic tape to the mechanism elements or an adverse affect to the recording/reproducing apparatus due to the electric charge caused by the friction when the tape is entrained at a high speed. In particular, the longer the length of the magnetic tape, the larger the effect thereof will become. Therefore, there is a problem in that the tape is likely to be electrically charged.

By the way, this friction sheet (hereinafter simply referred to as a sheet) is formed in general of high-density polyethylene resin (high density PE) or the like, and the electric resistance value thereof is very high at about $10^{16}$ Ω. For this reason, the sheet itself is likely to be charged. The sheet is readily charged and stuck with dust by the contact or the sliding contact of the sheet with the cassette inner wall surface, the magnetic tape or the take-up hubs. The magnetic tape or the take-up hubs are brought into sliding contact with the sheet to cause the peel charge so that this problem becomes more remarkable.

However, in the above-described conventional magnetic tape cassette, since the travel position of the magnetic tape is regulated by means of the friction sheet, the enhancement in the durability of the friction sheet and the reduction in the surface electric resistance value should be resolved.

Here, the durability of the friction sheet means a cut of the tape edge. The cut of the tape edge may be solved by using a porous sheet as the sheet. Thus, the problem of the durability may be solved.

By the way, in order to reduce the surface electric resistance value of the friction sheet, by utilizing the fact that the sheet is porous, it is possible to consider that, for example, anti-static agent such as a mixture including quaternary ammonium salt is dipped or coated to the sheet so that the anti-static agent is impregnated into the sheet. In the case where the anti-static agent is used for recovering the reduction of the surface electric resistance value of the sheet, the higher the concentration of the anti-static agent, the lower the surface electric resistance value will become, in general.

However, the anti-static agent is impregnated into fine holes formed in the sheet surface, fitted and adhered thereto. For this reason, in some cases, the anti-static agent is peeled off and dropped off by a slight collision. When the concentration of the anti-static agent is increased, not only is the cost increased but also the amount of adhesion of the anti-static agent to the sheet is increased. As a result, the amount of the anti-static agent that drops from the sheet is increased. The drops adhere to the magnetic tape to contaminate the tape and the interior of the cassette. The outer appearance and the product performance are damaged to lead the reduction of the quality of the magnetic tape per se and of the magnetic tape cassette.

Incidentally, a variety of large capacity storage apparatuses are used as storage devices for a computer system. In view of the large capacity of the storage, in particular, a magnetic tape medium is frequently used by a large-scale user. Among these, recently, a cassette type magnetic tape medium, i.e., a magnetic tape cassette is frequently used in view of the fact that it is easy to handle and to provide a large capacity.

As such a magnetic tape cassette, one in which: (take-up) hubs around which the magnetic tape is wound are accommodated on the right and left sides within the case; an opening for drawing out the tape is formed on a front face of the case; the front lid for opening and closing the opening is swingably installed on the front portion of the case; and the a slider that may be slide back and forth is provided on the lower surface side of the case, is used.

On the other hand, a cassette automatic delivery apparatus (hereinafter referred to as an auto loader) is an apparatus for accommodating a plurality of magnetic tape cassettes and delivering the cassettes in order by a delivery mechanism and is connected such that the magnetic tape cassettes are continuously automatically fed to the magnetic head portion of the recording/reproducing apparatus.

As shown in FIG. 12, such an auto loader 140 is structured, for example, as a recirculation type one such that magnetic tape cassettes 81 are inserted into the upper stage of a frame body 142 formed generally into a box shape and are discharged from the lower stage.

In the apparatus exemplified in FIG. 12, seven magnetic tape cassettes 81 as a whole may be accommodated, two magnetic tape cassettes 81 may be loaded on an upper stage guide member 144 formed in rails on the side walls, three magnetic tape cassettes 81 may be overlapped in a deep accommodating portion 146, and furthermore two magnetic tape cassettes 81 may be accommodated in a lower stage delivery portion 148.

The two magnetic tape cassettes 81 inserted onto the upper stage guide member 144 move toward the deep accommodating portion 146, drop by their gravitational force, and overlapped in order as the next magnetic tape cassette 81 is inserted. The lowermost magnetic tape cassette 81 of the deep accommodating portion 146 is delivered from the deep part to the forehand side in the direction indicated by the arrows by a delivery mechanism (not shown) to be moved and discharged in order along the lower stage delivery portion 148.

In the lower stage delivery portion 148, the magnetic tape cassette 81 to be discharged is moved to depress the rear portion of an opposite case 82 to a front lid 91. Incidentally, the details of the delivery mechanism and the opening portion of the frame member 142 through which the delivery mechanism is entered or discharged are not shown in the figures.

In the above-described recirculation type auto loader 140, an upper wall 152 of the upper surface portion of the lower delivery portion 148 is provided with a depression engagement member 150 for positioning and stopping the magnetic tape cassette 81 to be fed out. This depression engagement member 150 is composed of a leaf spring 150b provided with a thin roller 150a on a lower surface side, and one end of the leaf spring 150b is fixed to the above-described upper wall 152 as shown in FIG. 13.

The above-described roller 150a is depressed and contacted with the top surface of the case 82 of the magnetic tape cassette 81 by the biasing force of the leaf spring 150b. Then, a recess 85 is formed on the front side of the top surface of the case 82 in the magnetic tape cassette 81. The roller 150a is engaged with this recess 85 to thereby position the cassette.

Incidentally, since the basic structure of the magnetic tape cassette 81 is the same as that of a magnetic tape cassette 80 shown in FIGS. 6A and 6B to be described later except for a part (structure of the upper wall portion of a front lid 93 and the front end portion of an upper half 83) and the same reference symbols are used to indicate the same or like components, see the explanation thereof. Also, in the following description, the loading direction of the magnetic tape cassette 81 is referred to as the forward direction (direction indicated by the arrow A in FIG. 13) and the direction opposite this is referred to as the backward direction.

However, as described above, in the case where the magnetic tape cassettes 81 are loaded on the recirculation type auto loader 140 having the structure shown in FIG. 12 and delivered in order, when the roller 150a of the depression engagement member 150 for positioning corresponding to the delivery movement is moved under the depression condition on the top surface of the magnetic tape cassette 81, the above-described roller 150a is hooked to the front lid 91 to become an obstacle against the stable delivery movement and to apply an unnecessary (extra) force to the front lid 91 to thereby cause the curvature deformation to depress and open the front lid 91 and to thereby damage it.

Namely, as shown in FIG. 13, when the roller 150a depressed by the biasing force of the leaf spring 150b is engaged with the recess 85 on the upper surface of the case 82 of the magnetic tape cassette 81, the magnetic tape cassette 81 is moved rightward in FIG. 13 (in the direction indicated by the arrow D) by the delivery mechanism, the roller 150a is moved relative to the forward side on the top surface of the case 82 from the recess 85 and enters into a gap 98 defined between the rear end portion of the upper portion of the front lid 91 and the front end portion of the top surface of the case 82 as shown by reference symbol 150a' indicated by the broken lines. In some cases, the roller 150a is hooked at the rear end of the top portion of the front lid 91 and elastically deformed such that the central portion of a lid portion 92 is curved forward by means of the delivery force to be subjected to the force of opening (denoted by 92' indicated by another broken line in FIG. 13). In particular, the central portion of the above-described front lid 91 has a low rigidity and is deformed even by a weak force to expand the gap 98, and the above-described roller 150a is likely to be hooked.

Incidentally, the depression force of the above-described roller 150a is about 1 to 2 N. This is sufficient to depress and position a small size magnetic tape cassette 81. However, the roller 150a is hooked at the front lid 91 as described above and causes the generation of the opening force. If the depression force of the roller 150a is reduced, the generation of the hook at the above-described front lid 91 may be suppressed but there is a problem in that the positioning force is insufficient and unstable.

SUMMARY OF THE INVENTION

In view of the above-described problems inherent in the conventional art, a primary object of the present invention is to provide a cassette half and a molding method therefor that may prevent the generation of a weld in a window portion of the cassette half and to prevent the degradation in molding outer appearance in a cassette half whose window portion and upper half body is to be molded in a two-color injection molding.

In view of the above-described problems inherent in the conventional art, a secondary object of the present invention is to provide a magnetic tape cassette that may reduce an amount of wear or cut of a magnetic tape edge per se and a friction sheet while preventing the sticking of the magnetic tape without degrading the anti-static effect to the friction sheet and may remarkably reduce an amount of drop of an anti-static agent due to the friction even if the magnetic tape having the sharp tape edge is used and the friction between the magnetic tape edge and the sheet is kept at a high speed.

In view of the above-described problems inherent in the conventional case, in order to overcome the problems, a third object of the present invention is to provide a magnetic tape cassette in which a detecting roller of an auto loader is prevented from being hooked at a front lid of the magnetic tape cassette so that the front lid is not subjected to the opening force of opening the front lid upon the delivery by the auto loader.

In order to the primary object described above, the first mode of the first aspect of the present invention provides a cassette half molding method for molding one of upper and lower halves with an injection mold by injection molding, the upper and lower halves being coupled with each other in a lid alignment manner to form a cassette case for accommodating a pair of take-up hubs around which a magnetic tape is wound, comprising the step of: molding a transparent or semitransparent window portion provided in the upper half with the injection mold, wherein a gas vent pin for smoothing a flow of molten resin to be introduced in the window portion is provided in the infection mold.

In order to the primary object described above, the second mode of the first aspect of the present invention provides a cassette half that is molded with an injection mold by injection molding and that is one of upper and lower halves that are coupled with each other in a lid alignment manner to form a cassette case for accommodating a pair of take-up hubs around which a magnetic tape is wound, wherein a transparent or semitransparent window portion having a take-up hub position regulating rib is provided on the upper half, and wherein the upper half is molded by the infection mold provided with a gas vent pin for smoothing a flow of molten resin at a portion perpendicular to a flow direction of the molten resin of a ceiling surface of the take-up hub position regulating rib when the window portion is molded by the injection molding.

In order to the secondary object described above, the second aspect of the present invention provides a magnetic tape cassette comprising: a body formed by coupling an upper half and a lower half with each other in a lid alignment manner; a pair of take-up hubs around which a magnetic tape is wound and which are rotatably accommodated in the cassette body; and a friction sheet interposed either between the pair of take-up hubs and the upper half, or between the pair of take-up hubs and the lower half, or both, wherein the thickness of the magnetic tape is equal to or less than 7.7 $\mu$m (0.0003 inches), the maximum winding length is equal to or more than 120 m (131.2 yards), and the maximum speed for the tape being wound to the cassette body is 2 m/sec or more, and wherein the friction sheet is made of polyethylene-based resin and has a surface electric resistance value in the range of $1 \times 10^7$ $\Omega$ to $1 \times 10^{10}$ $\Omega$.

It is preferable that the polyethylene-based resin is fluorine-based resin in which a part of or all of hydrogen atoms contained in molecules constituting a polymer compound are substituted by fluorine atoms.

In order to the third object described above, the third aspect of the present invention provides a magnetic tape cassette which is loaded onto a cassette auto delivery apparatus for accommodating a plurality of magnetic tape cassettes and for sequentially delivering the magnetic tape cassette by a delivery mechanism, comprising: a body case; a first recess formed in a top surface of the body case for retaining a depression engagement member having a spring and a roller provided in the cassette auto delivery apparatus for positioning and stopping; a front lid provided swingably at a front face of the body case for opening and closing an opening for drawing out a magnetic tape; and a slider disposed in a lower surface of the body case and slidable in backward and forward directions, wherein a rib for reducing a resistance when the roller passes through a gap between the top surface of the body case and the front lid is provided at a position corresponding to the first recess and on a side of the front lid in the top surface of the body case.

It is also preferable that the magnetic tape cassette further comprises a second recess corresponding to a convex portion of the rib at a position of the front lid corresponding to the rib.

DETAILED DESCRIPTION OF THE INVENTION

A magnetic tape cassette, a cassette half and a cassette half molding method according to the present invention will now be described in detail with reference to the accompanying drawings.

A cassette half and its molding method in accordance with a first aspect of the present invention will now be described with reference to FIGS. 1 and 2.

Figure 1:
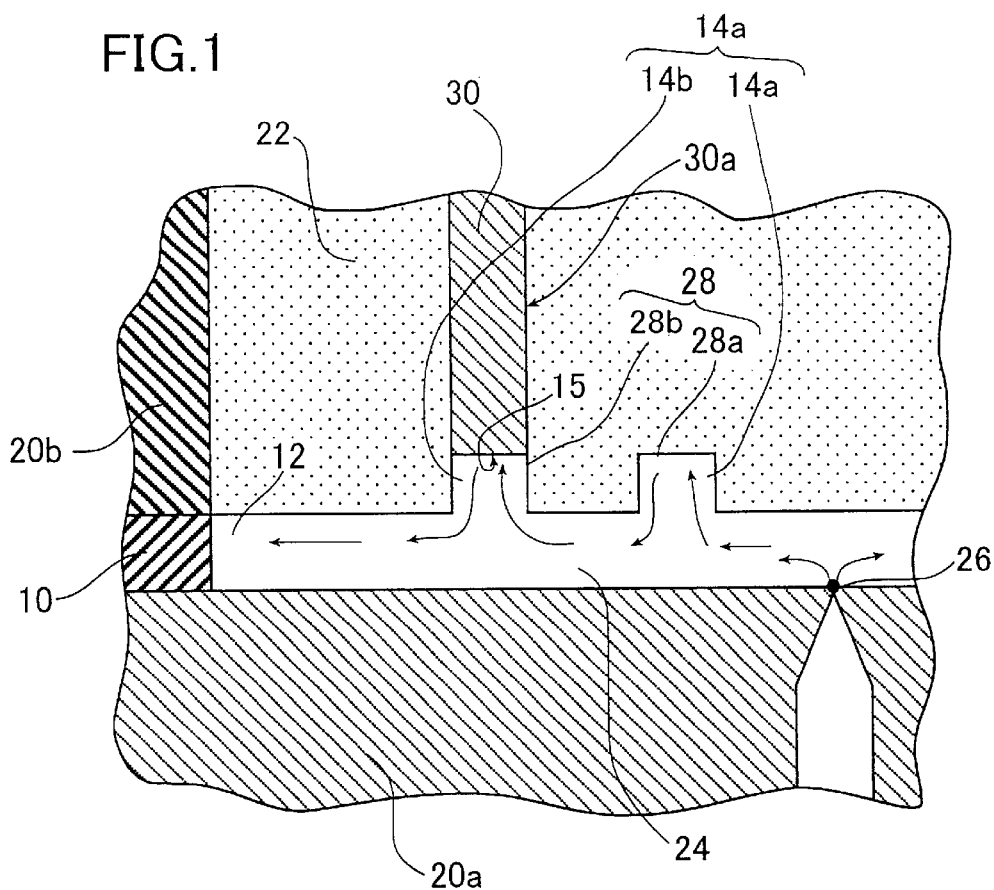
FIG. 1 is a cross-sectional view showing a state in which a window portion of an upper half in accordance with an embodiment of the present invention through a molding method of a cassette half in accordance with the present invention.

A state is shown in FIG. 1 in which an upper half having a transparent window portion according to a second embodiment of the present invention is formed in a two-color injection molding in accordance with the molding method of the cassette half in accordance with a first embodiment of the first aspect of the present invention.

As shown in FIG. 1, an upper half 10 of a DDS (Digital Data Storage) cassette or cartridge has a transparent window 12 and is molded by means of molding dies (a front mold 20a, a movable cavity or mold 20b and a slide core 22). In the same manner as in the conventional case, first of all, molten resin is introduced into a space (cavity) surrounded by the front mold 20a, the movable mold 20b and the slide core 22.

Thereafter, as shown in FIG. 1, the slide core 22 is slidingly moved corresponding to a thickness of the window portion 12 to form the space (cavity) 24 for molding the window portion 12. The transparent resin (for example, AS) is injected from a gate 26 to the cavity 24 to form the window portion 12.

At this time, the molten resin injected from the gate 26 into the cavity 24 is advanced as indicated by the arrows in FIG. 1. The resin is once introduced into recessed portions such as recesses 28 (28a, 28b) of the slide core 22 corresponding to take-up hub position regulating ribs 14 (14a, 14b) and again comes out to flow straightly.

At this time, according to this embodiment, a gas vent pin 30 for smoothing the resin fluid is provided in a ceiling surface 15 of the take-up hub position regulating rib 14b on a remote position from the gate 26. Since the gas vent pin 30 is provided as a discrete member in the slide core 22, a slight gap (clearance) 30a is provided between the slide core 22 and the gas vent pin 30 so that the gas generated in the resin due to the heat will be discharged therefrom.

Figure 2:
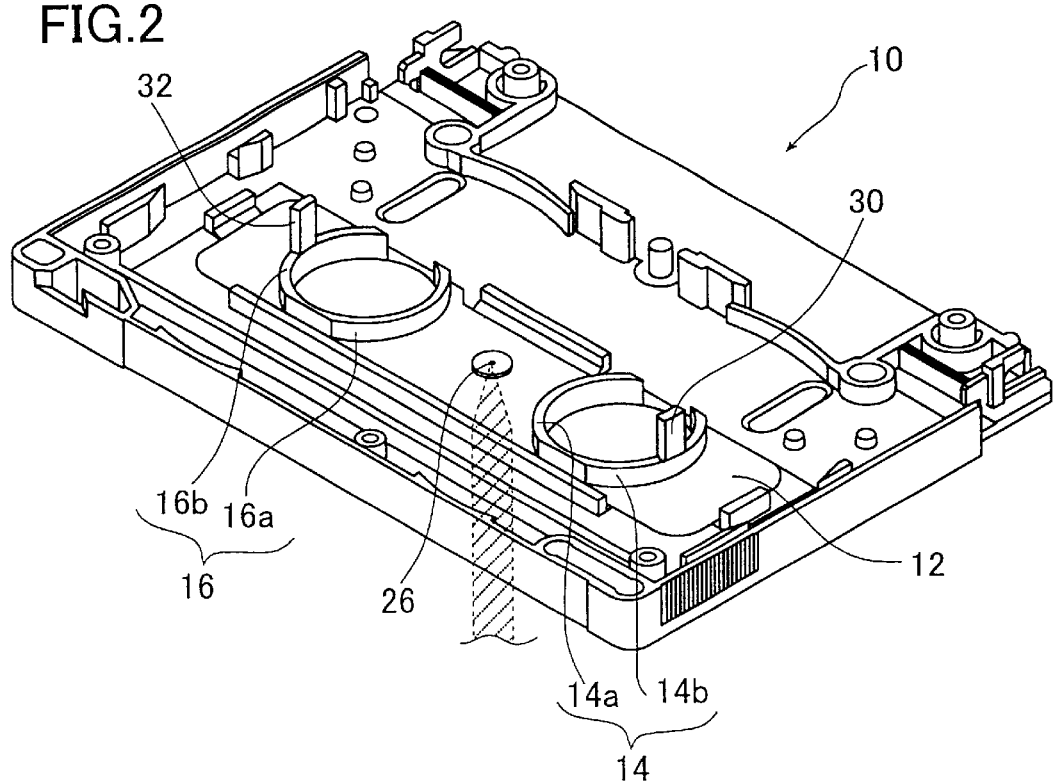
FIG. 2 is a perspective view showing simply a state of molding of the window portion shown in FIG. 1.

This state is shown in a perspective view of FIG. 2. In FIG. 2, for the sake of simplification, only the gate and the gas vent pin are shown.

As shown in FIG. 2, the gas vent pin 30 is provided in an upright position on the ceiling surface 15 of the take-up hub position regulating rib 14b on a remote position from the gate 26. Furthermore, the resin flows from the gate 26 on the right and left sides (in the longitudinal direction of the window portion 12). The gas vent pin 30 is provided at the position perpendicular to the direction in which the resin flows. As shown in FIG. 2, the window portion 12 is symmetric with respect to the gate 26. In the same manner, a gas vent pin 32 is also provided in a ceiling surface of a rib 16b at a remote position from the gate 26 of the other take-up hub position regulating ribs 16 (16a, 16b) provided in the window portion 12.

As described above, in the portion of the take-up hub position regulating ribs 14, 16 that are provided in the window portion 12, the flow of the molten resin is changed and the flow is obstructed. At this time, the gas generated within the molten resin is stagnant in the recesses or recessed portions, where such a molten resin flow is changed, to thereby further obstruct the flow of the molten resin.

In this embodiment, since the gas vent pins are provided at the positions where the resin flow is stagnant (changed), it is possible to discharge the gas to the outside of the molds effectively and to smooth the resin flow. As a result, it is possible to suppress the generation of the weld.

Incidentally, in this embodiment, the gas vent pins are provided in the ceiling surfaces of the take-up hub position regulating ribs remote from the gate. Since the resin is just injected from the gate and the pressure of the resin is still kept high on the near side to the gate, the obstruction against the flow is relatively small. Therefore, it is more effective to provide the gas vent pins on the remote side from the gate.

However, it goes without saying that in the same manner the gas vent pins may be provided also on the take-up hub position regulating ribs on the near side to the gate. The gas vent pins are provided in the positions of the ceiling surfaces of both the take-up hub position-regulating ribs to thereby ensure the further effect.

Thus, it is preferable to provide the gas vent pins to the positions of the ceiling surface of the take-up hub position regulating ribs remote from the gate. However, the position is not limited thereto. The gas vent pins are provided in the position where the resin flow is changed to ensure the sufficient gas ventilation effect.

As described above, in this embodiment, since the gas vent pins for discharging the gas that obstructs the flow of the molten resin are provided in the most effective positions, it is possible to discharge the gas to the outside of the molds effectively to smooth the flow of the resin to thereby prevent the generation of the weld and to thereby give a good appearance to the final product of the upper half.

The cassette half and the molding method thereof according to the first aspect of the present invention are constructed basically as described above.

A magnetic tape cassette according to a second aspect of the present invention will now be described with reference to FIGS. 3 and 4.

Figure 3:
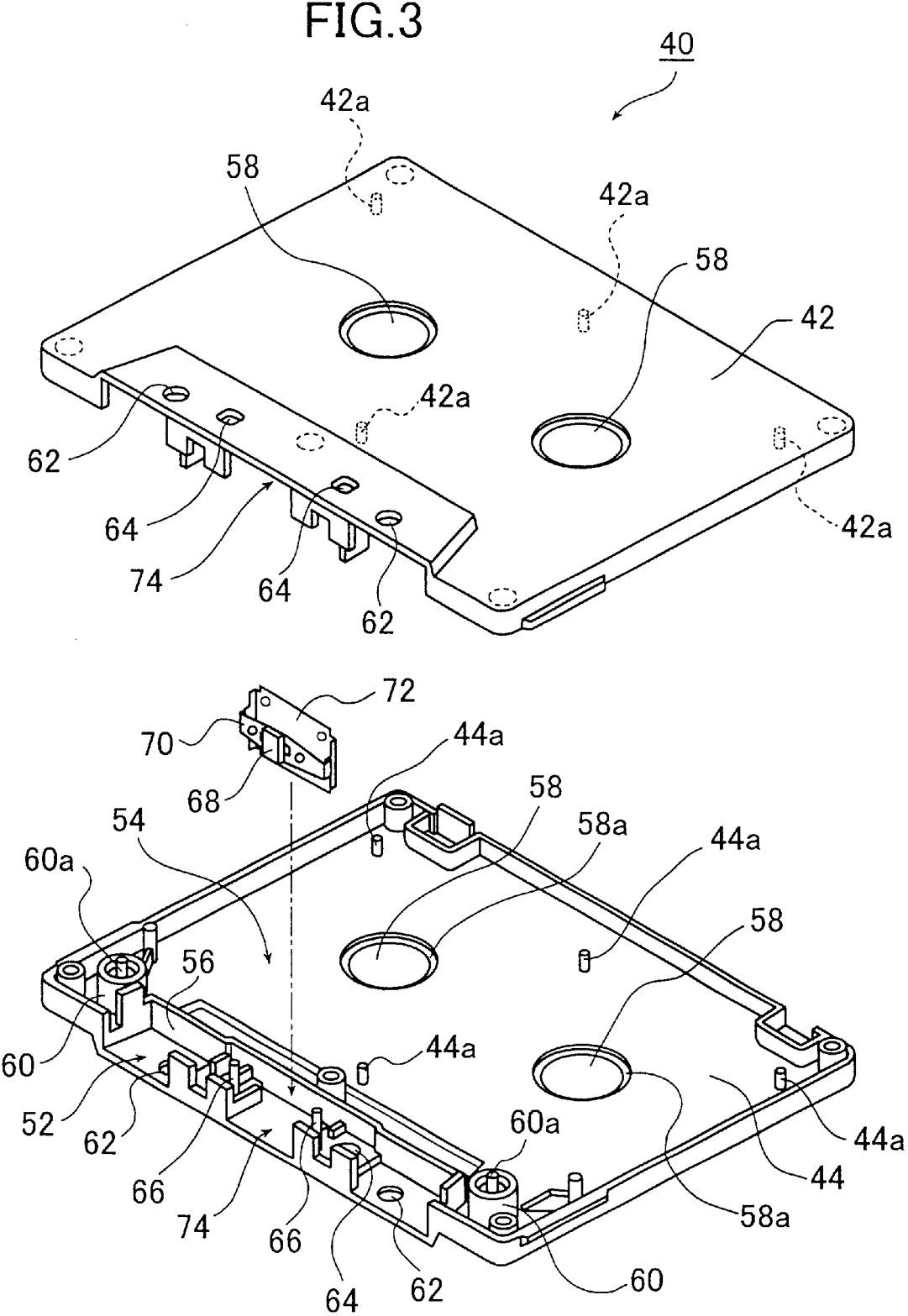
FIG. 3 is an exploded perspective view of an embodiment of the cassette body of the magnetic tape cassette according to the invention.

FIG. 3 is a partially exploded perspective view showing a schematic structure of one embodiment of a cassette body of a magnetic tape cassette according to a second aspect of the present invention. FIG. 4 is a partially exploded perspective view showing a schematic structure of one embodiment of a magnetic tape and friction sheets to be accommodated in the cassette body of the magnetic tape cassette shown in FIG. 3, the friction sheets clamping on both sides the magnetic tape wound around a pair of take-up hubs.

As shown in these drawings, the magnetic tape cassette (hereinafter simply referred to as a cassette) 40 is formed into a box by alignment and abutment of halves and has a pair of an upper half (upper cassette half) 42 and a lower half (lower cassette half) 44 (see FIG. 3) constituting the cassette body, a pair of take-up hubs 46, 46 to be accommodated in the cassette body, a magnetic tape 48 to be wound around the pair of take-up hubs 46, 46, and friction sheets (hereinafter simply referred to as sheets) 50, 50 (see FIG. 4) interposed between the take-up hubs 46, 46 and the magnetic tape 48 to be wound around the pair of these hubs and the upper half 42 and between the take-up hubs 46, 46 and the magnetic tape 48 to be wound around the pair of take-up hubs 46, 46 and the lower half 44, respectively.

As shown in FIG. 3, the pair of upper half 42 and lower half 44 have substantially the same shape and are provided with a partitioning wall 56 for partitioning the hollow interior portion of the cassette body, formed by these halves, into a recording/reproducing region 52 and a hub accommodating region 54 (where the interior portion is not shown in the upper half 42).

A pair of spindle shaft insertion holes 58, 58 into which a pair of spindle shafts of a recording/reproducing apparatus for driving and rotating the pair of take-up hubs 46, 46 are to be inserted, a pair of hub supporting annular ribs 58a, 58a for pivotally regulating (or supporting) the pair of take-up hubs 46, 46 along the inner circumferential edges of these spindle shaft insertion holes 58, 58, a pair of rotary guide rollers 60, 60 on both sides on the front side and the like are provided substantially in the central portion on both sides of the hub accommodating region 54 of each of the pair of upper and lower halves 42 and 44 symmetrically on right and left sides with respect to the centerline in the cassette front and rear direction (where the side of the recording/reproducing region 52 to the hub accommodating region 54 will hereinafter be referred to as a front side). Incidentally, the pair of guide rollers 60 and 60 are rotatably supported to a pair of pins 60a and 60a implanted in an upright position in the lower half 44.

Also, a pair of capstan insertion holes 62, 62, a pair of cassette positioning holes 64, 64 and the like are formed symmetrically with respect to the above-described centerline in the recording/reproducing region 52 of each of the pair of upper and lower halves 42, 44. A pair of head pins 66, 66 and the like are provided in an upright position symmetrically with respect to the above described centerline on the inside of the pair of cassette positioning holes 64, 64 in the recording/reproducing region 52 of the lower half 44.

Furthermore, a leaf spring 70 that is a planar support member for supporting a pressure pad 68 is provided on the rear side of the pair of head pins 66, 66, and a shield plate 72 is assembled on the rear side of the leaf spring 70. A magnetic head insertion opening 74 through which the magnetic head (not shown) of the recording/reproducing apparatus is to be inserted from the front side of the cassette upon the recording/reproducing mode is formed in the front side of the central portion of the recording/reproducing region 52 of each of the pair of upper and lower halves 42 and 44.

Then, when the magnetic head is inserted into the recording/reproducing region 52 from the magnetic head insertion opening 74, a tip end of the magnetic head and the magnetic tape 48 is depressed inwardly of the cassette 40 together with the pressure pad 68. As a result, the magnetic tape 48 is brought into pressing contact with the magnetic head (head gap formed at its tip end) by the tension of the magnetic tape 48 tensioned between the pair of head pins 66, 66 and the depression force of the pressure pad 68 on the basis of the biasing force of the leaf spring 70. In the recording/reproducing mode, the take-up hubs 46, 46 engaging with the pair of spindle shafts of the recording/reproducing apparatus are driven and rotated by means of the spindle shafts. The magnetic tape 48 is tensioned between both head pins 66, 66 and travels in sliding contact with the magnetic head. The audio information recorded on the magnetic tape is reproduced, and inversely, the audio information is recorded on the magnetic tape.

Figure 4:
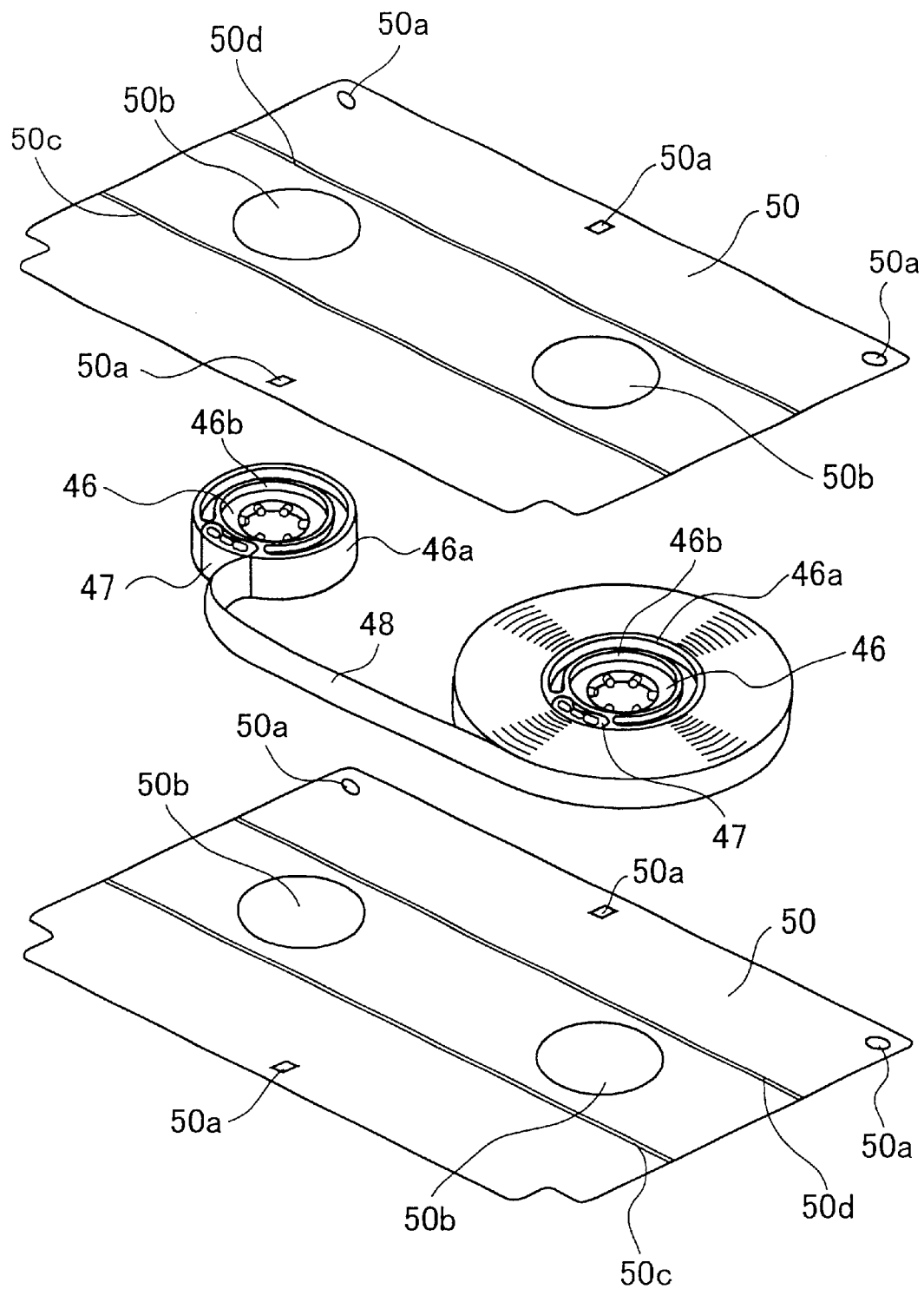
FIG. 4 is a partially exploded perspective view showing a schematic structure of an embodiment of a magnetic tape and friction sheets for clamping on both sides the magnetic tape wound around pair of take-up hubs which are accommodated in the cassette body of the magnetic tape cassette shown in FIG. 3.

As shown in FIG. 4, the magnetic tape 48 is wound around the pair of take-up hubs 46, 46. Each of the take-up hubs 46, 46 is provided at its outer circumference with the tape winding ring 46a. The side surface becomes the magnetic tape winding surface. Also, a small piece 47 that may be removed for fixing the end portion of the magnetic tape 48 is mounted on the part of the tape-winding ring 46a. A small diameter ring 46b is formed on the inner circumferential side of the take-up hub 46 and engages with the hub supporting annular rib 58a of the spindle shaft insertion hole 58 of the pair of upper and lower halves 42 and 44 to support the take-up hub 46 rotatably and to regulate the removal of the take-up hub 46 from the position of the spindle shaft insertion hole 58.

Here, the magnetic tape 48 used in accordance with the invention has to have a maximum winding length of 120 m or more and a thickness of 7.7 $\mu$m or less. Also, the magnetic tape 48 has a maximum winding speed of 2 m/sec (2.19 yards/sec) or more to the cassette body of the cassette 40. Namely, there is a case where the magnetic tape 48 used in the present invention has the winding speed of 2 m/sec or more when the magnetic tape 48 is cut by, for example, a slitter to be wound into the cassette body upon the manufacture of the cassette 40 according to the present invention. Also, there is a case where the winding speed of the magnetic tape into the cassette body in the fast feed mode or the rewind mode when the magnetic tape is mounted on the recording/reproducing apparatus is 2 m/sec or more. Incidentally, it goes without saying that the winding speed of the magnetic tape into the cassette body when the cassette is loaded on the recording/reproducing apparatus for the usual recording/reproducing mode, i.e., the regular recording or reproducing speed may be 2 m/sec or less and usually, equal to 2 m/sec or less.

It is preferable that the thickness of the magnetic tape 48 is in the range of 2 to 6 $\mu$m (0.000079 to 0.0002 inches), the maximum winding length is in the range of 120 to 150 m (131.2 to 164 yards), and the maximum winding speed to the cassette body is in the range of 2 to 4 m/sec (2.19 to 4.37 yards/sec).

The reason why the thickness of the magnetic tape 48 used in the present invention is limited to 7.7 $\mu$m or less is that the tape edge of the magnetic tape having the thickness of 7.7 $\mu$m or less becomes sharp, and the durability of the member that is to come into contact with tape edge, i.e., a friction sheet 50 to be described later would cause a problem. Also, the reason why the maximum winding length of the magnetic tape 48 is limited to 120 m or more and the maximum winding speed of the magnetic tape 48 to the cassette body is limited to 2 m/sec or more is that the surface electric resistance value of the magnetic surface or the base material of the regular magnetic tape 48 that used in the present invention is in the range of $1 \times 10^5$ $\Omega$ to $1 \times 10^{12}$ $\Omega$, there is an adverse affect to the head of the recording/reproducing apparatus and the breakdown such as the sticking of the magnetic tape to the mechanical parts due to the charge caused by the friction when the long tape is wound, or when the tape is wound at a high speed. In particular, the longer the magnetic tape, the more the adverse affect will become and the more likely the charging will be.

The magnetic tape 48 used in the present invention has the above-described thickness and length. There is no problem if the winding speed to the cassette body may be the above-described maximum winding speed and any kind of magnetic tape may be used. Namely, there is no special limit put on the material and use of the magnetic tape of the cassette according to the present invention. Accordingly, there is no special limit put on the base material or the magnetic material used. The base material or magnetic material may be made of any kind of material.

Also, it is possible to select as the base material of the magnetic tape used in the present invention any known base material used in the conventional magnetic tape. However, it is preferable to select as the base material PET (polyethylene terephthalate), PEN (polyethylene naphthalate), aramide or the like. It is preferable that the thickness of the magnetic material is in the range of 2 to 6 $\mu$m. More preferably, the thickness is in the range of 2.5 to 4 $\mu$m (0.000098 to 0.000157 inches). Also, it is preferable that Young's coefficient of the magnetic tape is 500 kg/mm$^2$ (711,155 lbs/in$^2$) or more in the lateral and longitudinal directions.

Also, it is possible to select as the base material of the magnetic tape used in the present invention any known base material used in the conventional magnetic tape. However, it is preferable to select as the base material PET (polyethylene terephthalate), PEN (polyethylene naphthalate), aramide or the like. It is preferable that the thickness of the magnetic material is in the range of 2 to 6 $\mu$m. More preferably, the thickness is in the range of 2.5 to 4 $\mu$m. Also, it is preferable that Young's coefficient of the magnetic tape is 500 kg/mm$^2$ or more in the lateral and longitudinal directions.

Also, as shown in FIG. 4, the friction sheets 50, 50 are interposed between the take-up hubs 46, 46 around which the magnetic tape 48 is wound and the inner wall surface of the cassette 40, i.e., between the take-up hubs 46, 46 and the upper half 42 and between the take-up hubs 46, 46 and the lower half 44, respectively. Four small holes 50a formed in these sheets 50, 50 are engaged with four ribs 42a of the upper half 42 and the lower half 44 shown in FIG. 3, so that the sheets 50 are positioned in the upper half 42 and the lower half 44. Also, pairs of insertion holes 50b, 50b are formed in the sheet 50, 50 corresponding to the respective two spindle shaft insertion holes 58, 58 of the upper half 42 and the lower half 44.

Two linear stamped portions two drawn portions 50c and 50d are provided in the respective cassette right and left directions (in the direction perpendicular to the back-andforth direction of the cassette 40) in the friction sheets 50, 50. The sheets 50, 50 serve to reduce the sliding resistance when the take-up hubs 46, 46 rotate and to smooth the rotation and at the same time to support the take-up hubs 46, 46 around which the magnetic tape 48 is wound and to regulate the height by the stamped portions 50c, 50d.

In the foregoing example, the sheets 50, 50 are interposed between the magnetic tape 48 and both the pair of take-up hubs 46, 46 and the upper half 42 and the lower half 44, respectively. However, the present invention is not limited to this specific arrangement. The sheet may be interposed only between the hubs and either one of the halves.

It is necessary to make the friction sheet 50 of polyethylene-based resin according to the present invention. This is because the sheet is not worn or less to keep the durability of the sheet by the contact at the tape edge even in the magnetic tape 48 having the sharp tape edge having a thickness of 7.7 $\mu$m or less. Since the durability of the sheet 50 may be further enhanced, it is more preferable that the sheet 50 is made of porous material.

The friction sheet 50 according to the present invention has the surface electric resistance value in the range of $1 \times 10^7$ $\Omega$ to $1 \times 10^{10}$ $\Omega$. The surface electric resistance value needed for the sheet 50 with respect to the magnetic tape having the sharp tape edge that might be used in the above-described circumstances has been reviewed as a result of which this range is preferable.

The surface electric resistance value of the sheet 50 is selected in the above-described range, whereby, even if the friction between the sheet and the magnetic tape having the sharp edge is kept at a high speed, the amount of drop of the anti-static agent due to the friction is suppressed to a very low level, and it is possible to prevent the sticking of the magnetic tape without degrading the anti-static effect to the friction sheet and to suppress the wear of the sheet and the magnetic tape edge per se. Incidentally, the preferable range of the surface electric resistance value is in the range of $1 \times 10^9$ $\Omega$ to $1 \times 10^{10}$ $\Omega$.

In the present invention, in the case where the magnetic tape cassette has a plurality of friction sheets, it is sufficient that one out of these sheets meets the above-described requirements.

In order to meet the requirements described above, it is possible to impregnate the anti-static agent having a suitable concentration to the friction sheet. The anti-static agent to be used is not limited to any special one. For example, it is possible to use mixture containing quaternary ammonium salt, or the like.

As the impregnating method of the anti-static agent into the friction sheet, it is possible to adopt, for example, a dipping method of dipping an original friction sheet into an anti-static agent bath, a method of coating with a so-called coater and so on. It is possible to perform a well-known plasma process, a corona discharge process, an ultraviolet ray process or the like in advance to enhance the characteristics of the sheet in advance.

Here, as a method of measuring the surface electric resistance value of the magnetic tape and the friction sheet, a method in accordance with JIP X 6130 was adopted.

The reason why the friction sheet to be used in the magnetic tape cassette according to the present invention has to meet the characteristics as described above will now be described with reference to FIG. 5.

Figure 5:
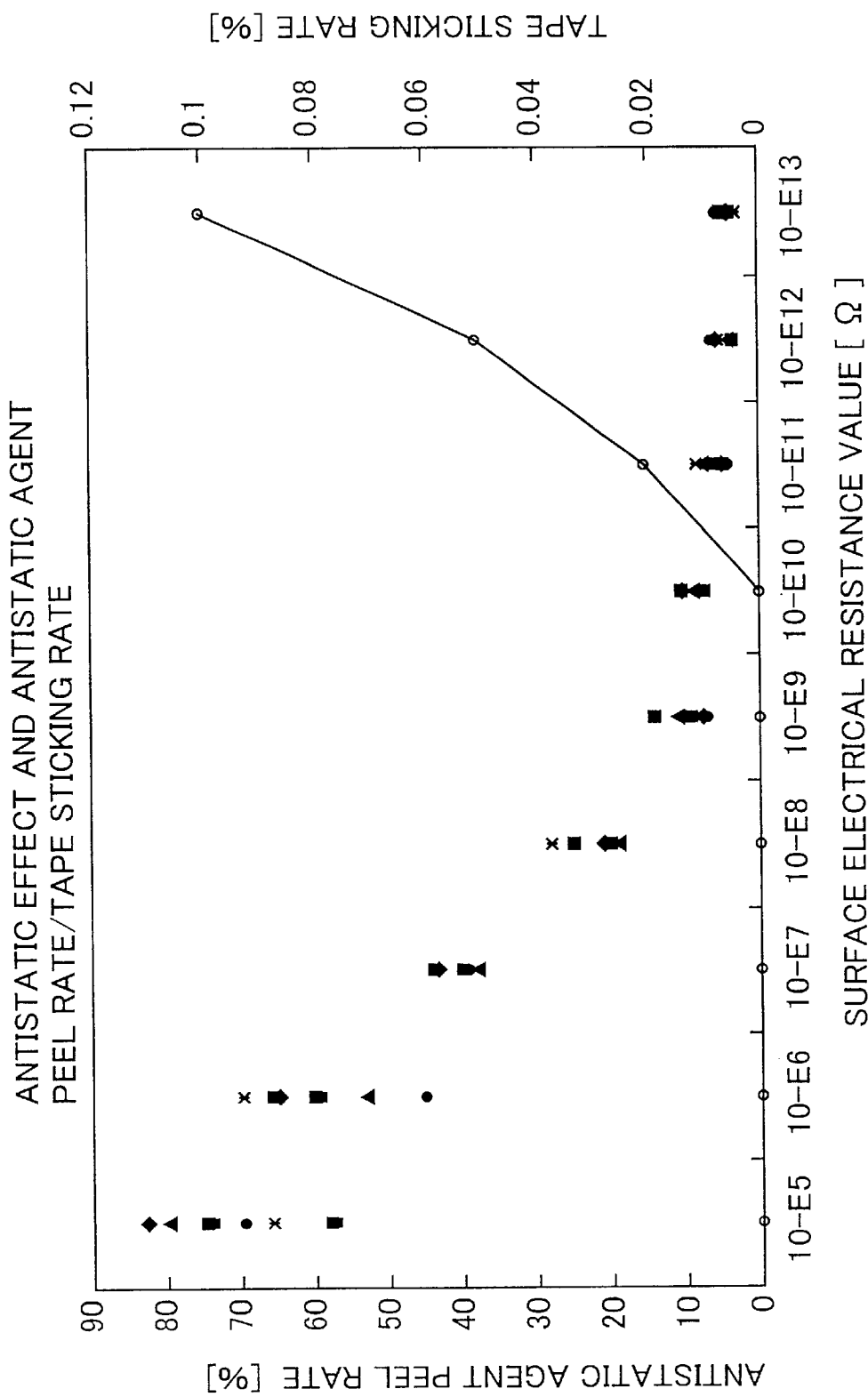
FIG. 5 is a graph showing a relationship between the surface electric resistance value of the friction sheet and the rate of sticking between the friction sheet and the magnetic tape and the relationship of the peel rate of the anti-static agent.

FIG. 5 is a graph showing an example of a relationship between the surface electric resistance value of the friction sheet and the rate of sticking of the magnetic tape to the friction sheet, and the relationship between the surface electric resistance value and the peel rate of the anti-static agent.

A friction sheet made of porous polyethylene was prepared as the friction sheet and was impregnated on both side surfaces by the dipping method using an anti-static agent (ammonium salt mixture) of various concentrations so that the surface electric resistance value was in the range of $1 \times 10^5$ $\Omega$ to $1 \times 10^{13}$ $\Omega$.

Next, a magnetic tape was prepared in which a base material was aramide and wherein the thickness of the magnetic layer was 2 $\mu$m, the total tape thickness was 5.6 $\mu$m (0.00022 inches), the width was 4 mm (0.157 inches), and the surface electric resistance value was $1.0 \times 10^6$ $\Omega$.

Samples of the cassette bodies provided with the above described various friction sheets were prepared. Under the condition of temperature of 23° C. (73.4° F.) and the relative humidity of 50%, the above-described magnetic tape was wound in the cassette bodies at a speed of 1 to 4 m/sec (1.09 to 4.37 yards/sec) by 125 m (136.7 yards). Thereafter, the rate of sticking of the magnetic tape (%) and the peel rate of the anti-static agent impregnated into the friction sheet were measured. The results are shown in FIG. 5. Incidentally, the rate of sticking of the magnetic tape is shown by a hollow circle. Also, the peel rate of the anti-static agent was indicated by solid signs by obtaining the result through the tests conducted eight times for each surface electric resistance value.

Here, the magnetic tape sticking means the phenomenon in which the magnetic surface of the magnetic tape is stuck to a certain surface of the cassette or the upper and lower sheets. Also, the magnetic tape sticking rate (%) means the proportion of cassettes in which the sticking takes place in the sampled cassette bodies (5,500 samples).

Also, the peel test of the anti-static agent was performed by removing the magnetic tape from the cassette body after the winding of the magnetic tape and observing with human eye whether or not the residue of the anti-static agent was stuck to the magnetic tape edge. Also, the peel rate (%) means the proportion of cassettes in which the residue was found on the magnetic tape edge in the sampled cassette bodies (100 samples) Incidentally, the judgement as to whether or not materials adhered to the magnetic tape edge were the anti-static agent was made through an FT-IR transmission method.

As shown in FIG. 5, when the surface electric resistance value was $1 \times 10^7$ $\Omega$ to $1 \times 10^{10}$ $\Omega$, it was possible to suppress the tape sticking rate down to 0.02% or less and to suppress the peel rate of the anti-static agent down to 46% or less.

For this reason, it is understood that the use of the friction sheet in these ranges makes it possible to suppress the peel of the anti-static agent to the minimum level and to obtain the magnetic tape cassette in which the magnetic tape would not be stuck to the friction sheet without degrading anti-static effect of the friction sheet.

Here it is possible to select, as the polyethylene-based resin used in the manufacture of the friction sheet 50 according to the present invention, polyethylene (PE) resin, porous polyethylene resin, polyethylene terephthalate (PET), or the like.

Furthermore, it is preferable to select, as the polyethylene-based resin used in the sheet 50 according to the present invention, fluorine-substituted polyethylene resin where a part of or all of hydrogen atoms contained in molecules of a polyethylene-based resin composition are substituted by fluorine atoms. It is possible to select, as such a fluorine-substituted polyethylene-based resin, polytetrafluoroethylene (PTFE), ethylene-tetrafluoroethylene copolymer (ETFE), tetrafluoroethylene-hexafluoropropylene copolymer (FEP), polyflruorovinylidene (PVDF), or the like.

Thus, the use of the fluorine-substituted polyethylene-based resin as the polyethylene-based resin for manufacturing the sheet 50 according to the present invention makes it possible to reduce the dynamic frictional coefficient of the sheet 50 and to enhance the sliding property of the magnetic tape. For instance, the value of the dynamic friction coefficient $\mu$ of the PE resin is approximately in the range of 0.22 to 0.35 whereas the dynamic friction coefficient $\mu$ of the PTFE resin is approximately in the range of 0.20 to 0.27. Accordingly, the PTFE resin can be used instead of the PE resin to thereby reduce the dynamic friction coefficient and to enhance the sliding property of the magnetic tape.

Examples of use of the magnetic tape cassette according to the present invention include known use as an audio magnetic tape cassette, a video magnetic tape cassette, a computer backup magnetic tape cassette, etc. Namely, the magnetic tape cassette according to the present invention is not limited to the above-described audio magnetic tape cassette but can be applied to, for example, a magnetic tape cassette that is of a type having a front lid for protecting the exposed front magnetic tape such as a video (VHS) magnetic tape cassette or an eight millimeter cassette, or a magnetic tape cassette that has a front lid or a slider for protecting the magnetic tape exposed on the front side such as a digital audio tape cassette (DAT) or a digital data storage (DDS), or the like.

Incidentally, in the cassette such as a video magnetic tape cassette, a digital audio tape cassette and a digital data storage in which the form of use is determined in advance, it is preferable for the friction sheet for supporting the take-up hubs and the magnetic tape from below, namely, the lower friction sheet to be formed of a porous polyethylene-based resin having the surface electric resistance value meeting the above-described characteristics, i.e., in the range of $10^7 \Omega$ to $1 \times 10^{10} \Omega$. It is even more preferable to form the sheet from a fluorine-substituted polyethylene resin sheet that meets the above-described characteristics. Since the friction sheet located on the lower side has greater frictional force than that of the upper sheet and greater sliding force than that of the upper sheet, such sheet is used as the sheet of the present invention to thereby prevent the sticking of the magnetic tape to the sheet and reduce the adverse affect of the drop of the anti-static agent.

The magnetic tape cassette according to the second aspect of the present invention is constructed basically as described above.

A magnetic tape cassette in accordance with a third aspect of the present invention will now be described with reference to FIGS. 6A, 6B and 7.

Figure 6A:
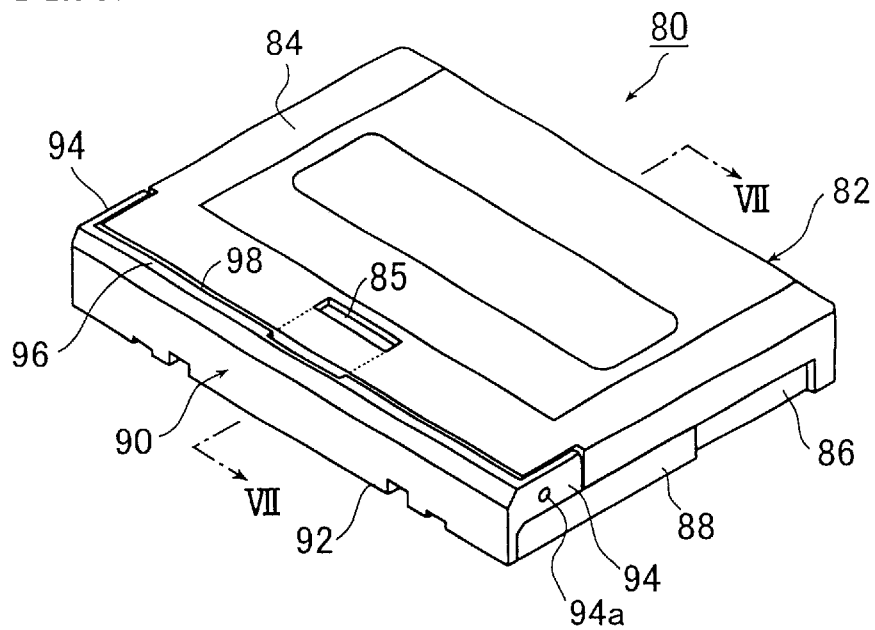
FIG. 6A is a schematic perspective view of an embodiment of a magnetic tape cassette according to the present invention.
Figure 6B:
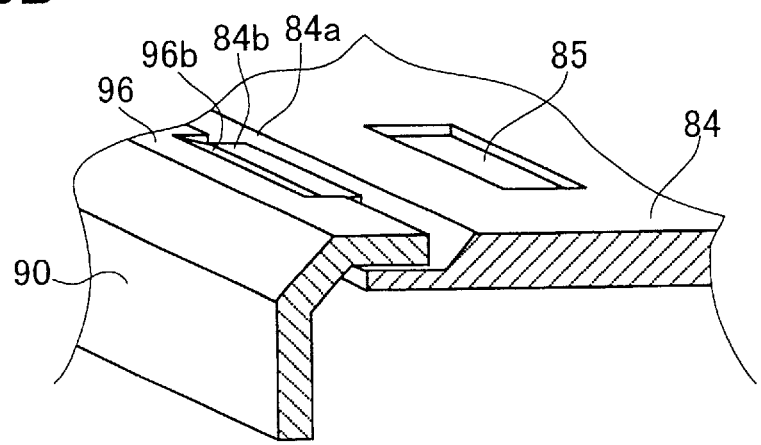
FIG. 6B is an enlarged detailed partially cutaway perspective view of B portion shown in FIG. 6A.

FIG. 6A is a schematic perspective view of a magnetic tape cassette 80 in accordance with one embodiment of the present invention. FIG. 6B is an enlarged detailed partially cutaway perspective view of B part shown in FIG. 6A. FIG. 7 is a cross-sectional view taken along the vertical surface along the moving direction of the magnetic tape cassette 80 passing through a central portion of its recess 85.

As described above, the magnetic tape cassette 80 is composed of a flat box-shaped case 82 obtained by coupling an upper half 84 and a lower half 86, a front lid 90 openably, closably and swingably mounted onto the front end portion of this case 82 and a slider 88 slidably mounted on the lower surface side of the case 82.

Although not shown, the magnetic tape is wound around both hubs and accommodated in the interior of the case 82. The front bottom surface portion and the front surface portion of the case 82 are cut out and an opening for tape loading for the recording/reproducing apparatus is formed. The lock of the front lid 90 that may open and close the opening for the tape drawing on the front surface side of the case 82 is released, and operates to open and close in accordance with a moving distance of the slider 88 when the slider 88 is moved backward in time with the loading operation onto the recording/reproducing apparatus.

Also, the slider 88 opens and closes the bottom opening portion of the lower half 86 in accordance with the back-and-forth sliding movement along the loading direction A as described above. Incidentally, drive shaft insertion holes are opened on both sides of the lower half 86 and the slider 88. Furthermore, a lock mechanism is provided for locking the slider 88 in the open position and the closed position. The above-described lock mechanism is released in accordance with the loading operation to the recording/reproducing apparatus. The slider 88 is then moved backward to open the bottom surface opening to lock the open position in the rearward position. A tape-loading device is inserted into the opened opening portion to draw the tape forward and to make it possible to open the front cover 90 for the recording/reproducing operation.

Figure 12:
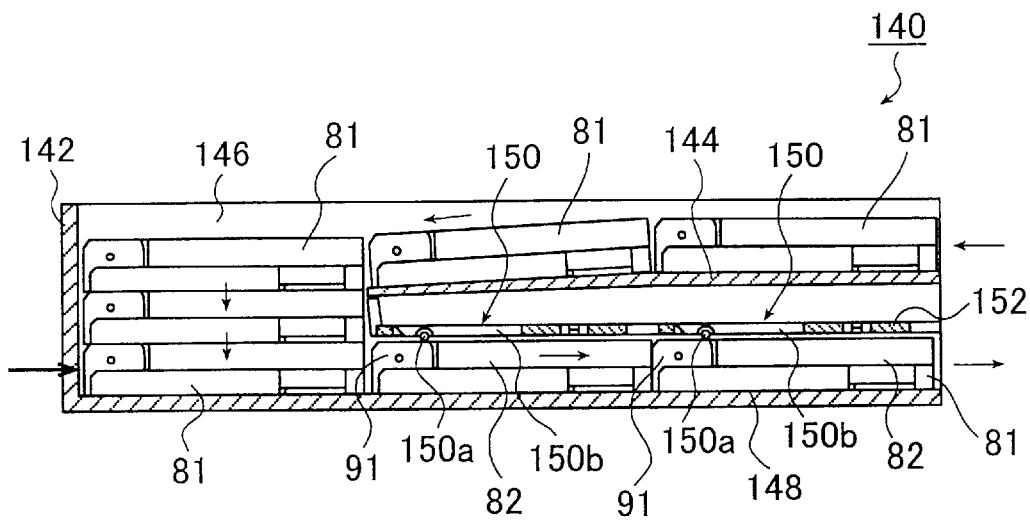
FIG. 12 is a view showing a schematic structure of an auto loader.
Figure 13:
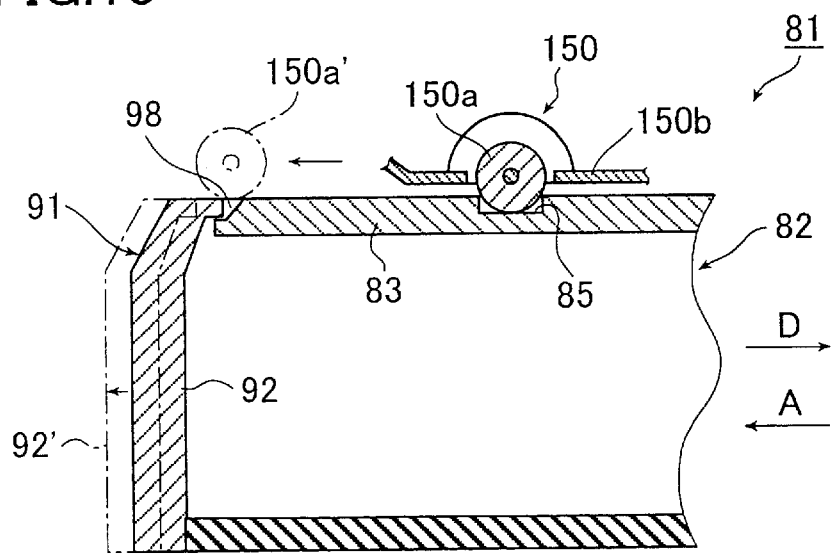
FIG. 13 is a view showing a concept of a magnetic tape cassette detection mechanism in the auto loader.

In the thus constructed magnetic tape cassette 80, the recess 85 is formed substantially in the central portion of the front portion of the upper surface of the upper half 84. The roller 150a of depression engagement member 150 for positioning in the auto loader 140 shown in FIG. 12 forehand is engaged with the recess 85.

Incidentally, the above-described recessed portion 85 is also called a changer grip.

The front lid 90 has a lid portion 92 for covering the front surface portion of the case body 82 and side walls 94 extending in the back and forth direction and coupled with both end portions thereof. A pair of pivot portions 94a of the side walls 94 on both sides are pivotally supported to the side surfaces of the upper half 84. The above-described lid portion 92 has an upper wall portion 96 bent rearward at its upper end portion. In the closed state shown in FIG. 6, the upper wall portion 96 is constructed so as to be continuous with the top surface of the upper half 84.

Figure 7:
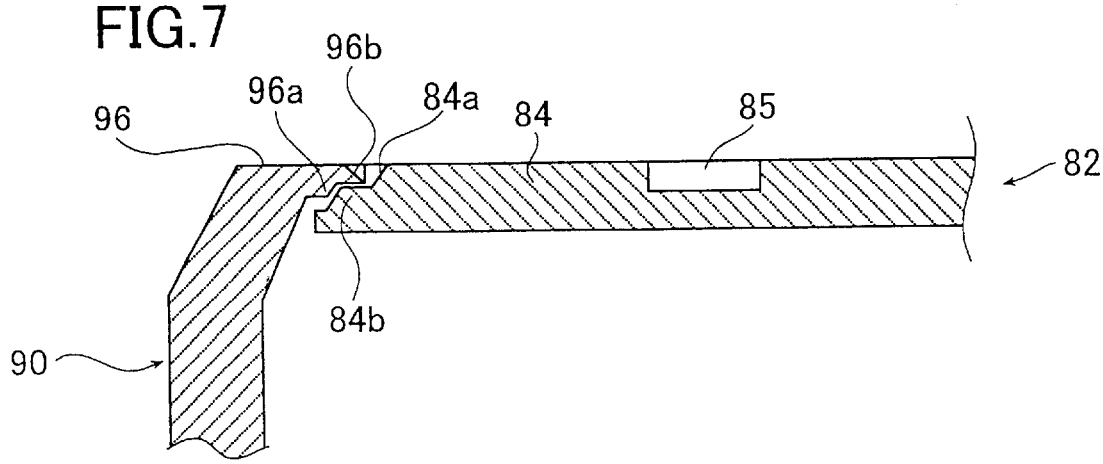
FIG. 7 is a cross-section view of the magnetic tape cassette taken along the line VII—VII of FIG. 6.
Figure 8:
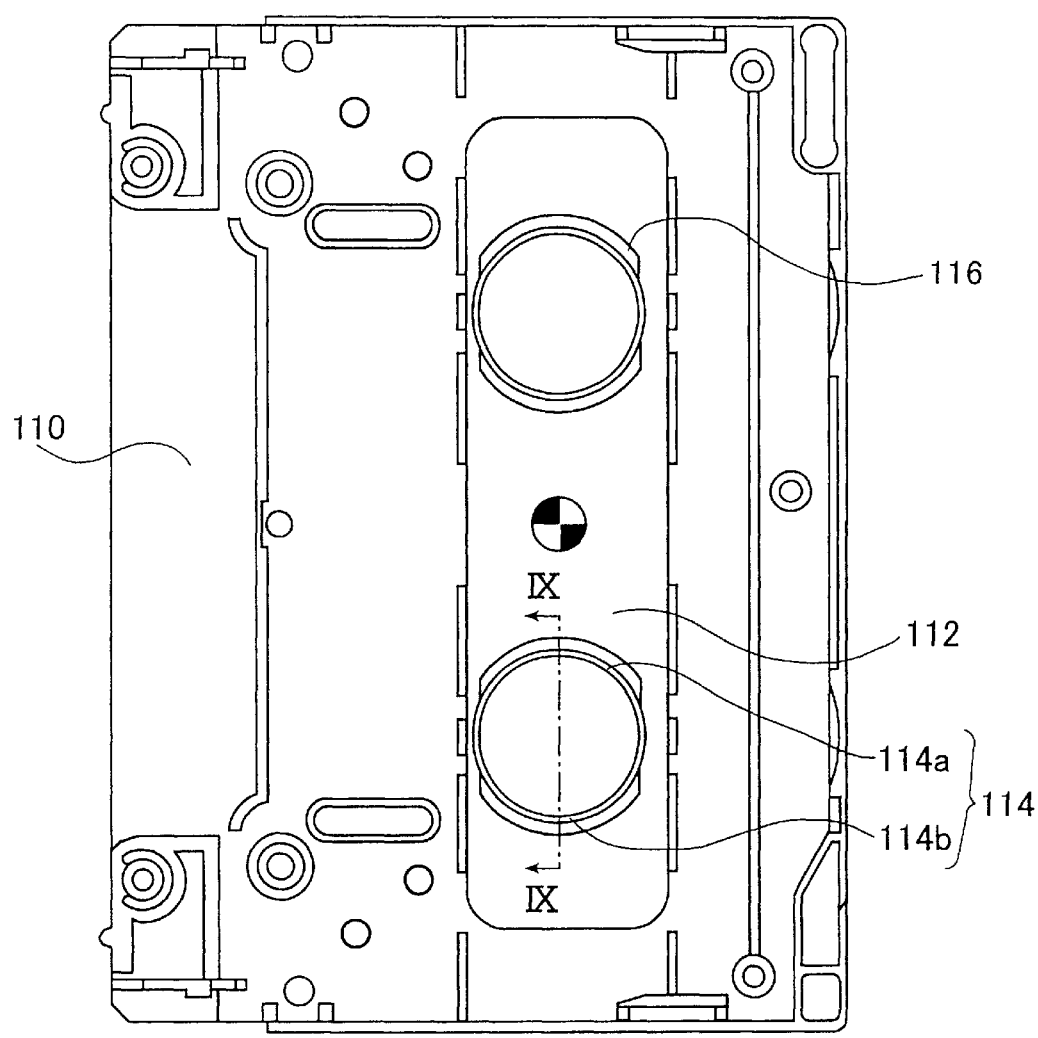
FIG. 8 is a plan view of an upper half of a conventional magnetic tape cassette.
Figure 9:
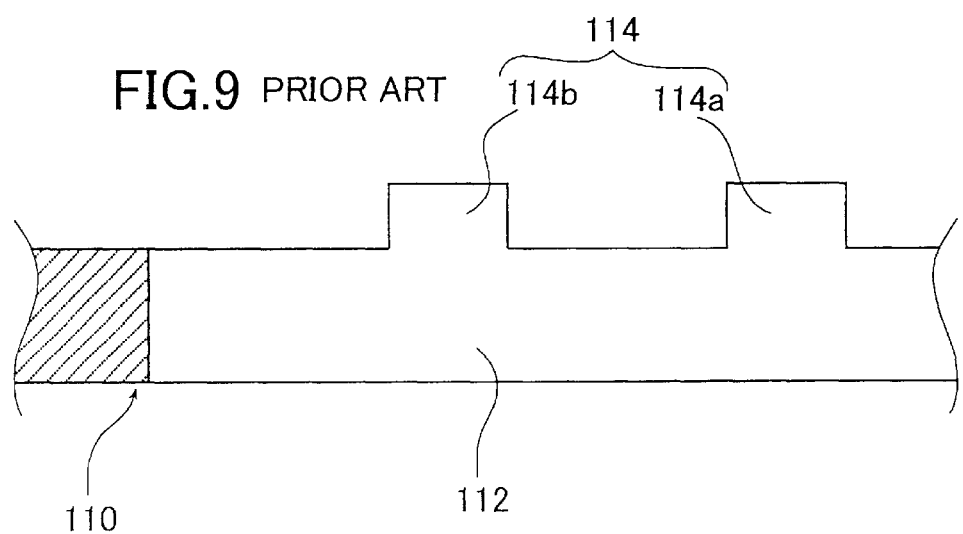
FIG. 9 is a cross-sectional view taken along the line IX—IX of FIG. 8.
Figure 10:
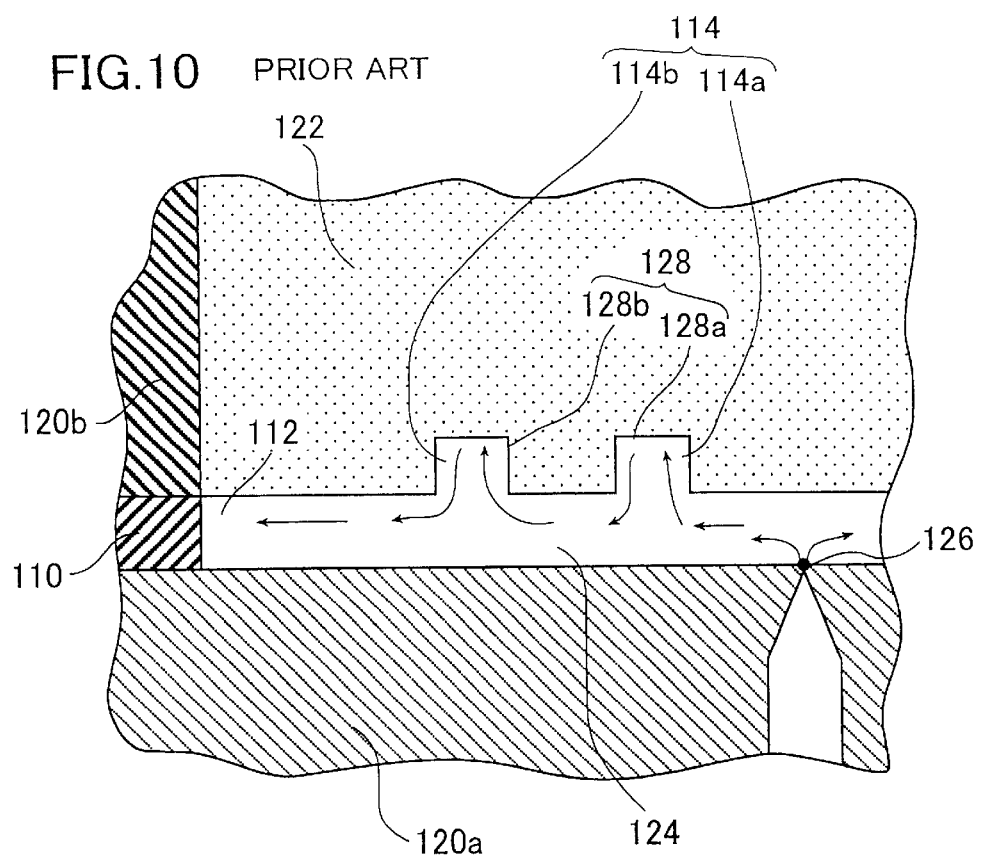
FIG. 10 is a cross-sectional view showing a conventional molding method of the upper half.
Figure 11:
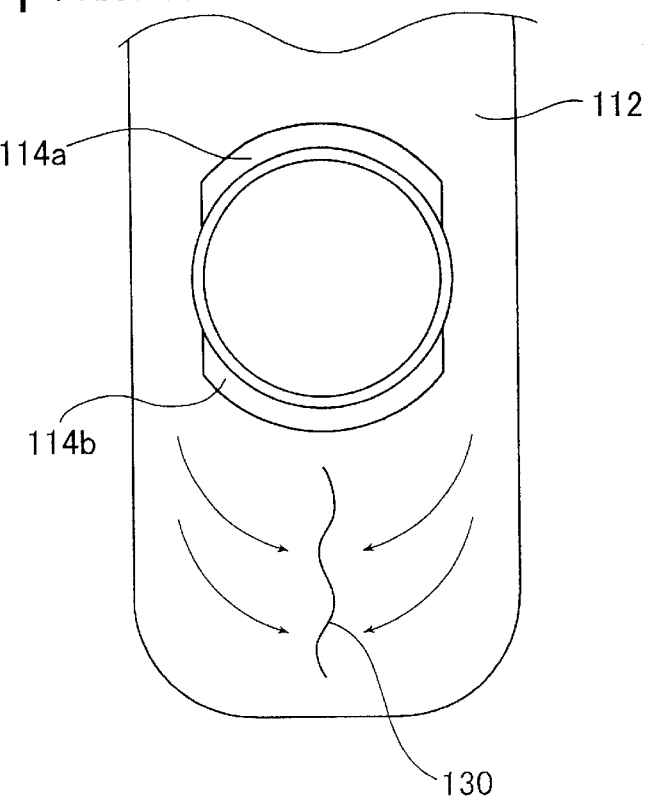
FIG. 11 is a plan view of a window portion of the upper half showing a problem inherent in the conventional molding method.

As shown in FIG. 7, a roller outlet side of the top surface of the above-described half 84 (on the side of the front cover 90) is a slanted flat surface (taper surface) 84a. A rib-shaped convex portion (hereinafter referred to as a rib) 84b is provided in the central portion in the widthwise direction of the taper surface 84a. This rib 84b is formed to allow the roller 150a to pass smoothly through the gap between the upper wall portion 96 of the front lid 90 and the above-described upper half 84.

FIG. 7 is an enlarged view of the vicinity of the gap 98 between the upper wall portion 96 of the front lid 90 and the above-described upper half 84. As shown in FIG. 7, since the bottom of the above-described gap 98 is made shallow by the rib 84b provided on the upper half 84, it is possible to realize the smooth passage of the roller 150a through the gap 98 in the magnetic tape cassette 80 according to this embodiment. It will be well understood that the passage of the roller 150a is facilitated in comparison with the case of the same portion of the conventional structure (where the rib 84b is not formed in the above-described gap 98).

Here it is preferable that the height of the above-described rib 84b is approximately in the range of 0.2 mm (0.0078 inches) to 0.7 mm (0.027 inches). Also, the width of the above-described rib 84*b* is sufficient to be somewhat wider than the width of the roller 150*a*, and for instance may be the width corresponding to the recess 85.

A recess (recessed portion) 96*b* having a depth and a width corresponding to the above-described rib 84*b* is formed in a position of the upper wall portion 96 of the above-described front lid 90 corresponding to the above-described rib 84*b*. The recess 96*b* thus suppresses the reduction in strength of the upper wall portion 96 of the front lid 90 to a minimum level.

Also, the front end portion of the upper wall portion 96 of the above-described front lid 90 (upper half 84 side) is formed into a taper surface 96*a* slanted toward the upper half 84. The slant angle of this taper surface 96*a* is preferably at 45 degrees for instance. However, this is not limited thereto or thereby. The angle may be in the range of about ±15 degrees with respect to 45 degrees. Furthermore, the shape of the taper surface 96*a* is not limited to the flat shape but the form of this taper surface 96*a* can also preferably be selected from various secondary curved surfaces such as a circle, an oval shape, a hyperbolic shape, and a parabolic shape. Also, a combination of a flat surface and a curved surface and a combination of different curved surfaces may be used.

According to the above-described embodiment, in the magnetic tape cassette 80, it is possible to facilitate the passage of the roller 150*a* of the auto loader through the gap 98 between the upper wall portion 96 of the front lid 90 and the above-described upper half 84 and to perform the smooth delivery of the magnetic tape cassette 80 in the auto loader. Thus, it is possible to obtain the effect for protecting the magnetic tape cassette 80 from the accident such as a breakdown.

One example of the present invention is shown in the form of the above-described embodiment. It goes without saying that the present invention is not limited thereto or thereby.

For example, it is possible to provide a taper surface like the taper surface 96*a* provided on the side of the recess 85 of the upper wall portion 96 of the front lid 90 at the outlet side of the recess 85 of the top surface of the above-described half 84. Otherwise, the side of the recess 85 of the upper wall portion 96 of the front lid 90 may be machined rough.

The magnetic tape cassette according to a third aspect of the present invention is constructed basically as described above.

Thus, the magnetic tape cassette, the cassette half used therein and the method for molding the cassette half have been described in detail while showing various embodiments. The present invention is not limited thereto or thereby. It goes without saying that various modifications and changes are possible within the scope of the present invention without departing from the spirit of the present invention.

As described in detail above, according to the cassette half and its molding method of the first aspect of the present invention, it is possible to discharge the gas contained in the molten resin generated due to the heat to the outside of the molds to thereby smooth the flow of the resin and prevent the generation of the weld. As a result, it is possible to enhance the quality of the appearance of the completed upper half.

Also, in the magnetic tape cassette according to the second aspect of the present invention, the friction sheet used is superior in durability and sliding property. Even if the magnetic tape having the sharp edge is traveled at a high speed, there is almost no sticking of the magnetic tape, and the peel of the anti-static agent and the peel of the magnetic tape and the friction sheet per se may be suppressed. Accordingly, there is no degradation in performance of the product.

Also, in the magnetic tape cassette according to the third aspect of the present invention, the detection roller of the auto loader is not hooked at the front lid of the magnetic tape cassette. When the magnetic tape cassette is delivered in the auto loader, it is possible to realize the magnetic tape cassette that is not subjected to a force of opening the front lid, which may cause the deformation of the magnetic tape cassette.

What is claimed is:

1. A magnetic tape cassette comprising:
   a body formed by coupling an upper half and a lower half with each other in a lid alignment manner;
   a pair of take-up hubs around which a magnetic tape is wound and which are rotatably accommodated in said cassette body; and
   a friction sheet interposed either between said pair of take-up hubs and said upper half, or between said pair of take-up hubs and said lower half, or both,
   wherein the thickness of said magnetic tape is equal to or less than 7.7 $\mu$m, the winding length is equal to or more than 120 m, and the speed for the tape being wound to the cassette body is 2 m/sec or more, and
   wherein the friction sheet is made of polyethylene-based resin and has a surface electric resistance value in the range of $1 \times 10^7$ $\Omega$ to $1 \times 10^{10}$ $\Omega$.

2. The magnetic tape cassette according to claim 1, wherein said polyethylene-based resin is fluorine-based resin in which a part of or all of hydrogen atoms contained in molecules constituting a polymer compound are substituted by fluorine atoms.

3. The magnetic tape cassette according to claim 1, wherein a maximum winding length is in the range of 120 m to 150 m and a maximum speed for the tape being wound to the cassette body is in the range of 2 m/sec to 4 m/sec.

4. The magnetic tape cassette according to claim 1, wherein at least a first hole is provided in the friction sheet that is concentrically aligned with the take-up hubs and at least a second hole is provided in the friction sheet that is not concentrically aligned with the take-up hubs.

5. The magnetic tape cassette according to claim 1, wherein the friction sheet has at least one linear stamped portion formed in a longitudinal direction of the friction sheet.

* * * * *